(12) United States Patent
Raulf et al.

(10) Patent No.: US 6,286,820 B1
(45) Date of Patent: Sep. 11, 2001

(54) PNEUMATIC SPRING WITH A VIBRATION DAMPER

(75) Inventors: Mathias Raulf, Dittelbrunn; Wolfgang Kolb, Werneck-Ettleben; Thomas Eichenmüller, Gochsheim; Dieter Lutz, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/460,947

(22) Filed: Dec. 14, 1999

(30) Foreign Application Priority Data

Dec. 14, 1998 (DE) .............................................. 198 57 291

(51) Int. Cl.⁷ ....................................................... F16F 9/04
(52) U.S. Cl. ..................................... 267/64.21; 267/64.24
(58) Field of Search ............................. 267/64.21, 64.23, 267/64.24, 64.26, 64.27

(56) References Cited

U.S. PATENT DOCUMENTS

| 2,980,441 | | 4/1961 | Timpner et al. . | |
|---|---|---|---|---|
| 3,000,624 | * | 9/1961 | Cislo | 267/64.21 |
| 3,147,671 | | 9/1964 | Geyer . | |
| 3,181,853 | * | 5/1965 | Howell | 267/64.24 |
| 4,325,541 | * | 4/1982 | Korosladanyi et al. | 267/64.21 |
| 4,398,704 | * | 8/1983 | Buchanan, Jr. et al. | 267/64.21 |
| 4,588,171 | * | 5/1986 | Stephens | 267/64.24 |
| 4,712,776 | * | 12/1987 | Geno et al. | 267/64.21 |
| 4,771,994 | * | 9/1988 | Makita | 267/64.21 |
| 6,089,552 | * | 7/2000 | Pahl | 267/64.21 |
| 6,168,143 | * | 1/2001 | Lambrecht et al. | 267/64.24 |

FOREIGN PATENT DOCUMENTS

| 1 225 919 | 9/1966 | (DE) . |
|---|---|---|
| 296 19 081 | 2/1997 | (DE) . |
| 196 25 106 | 1/1998 | (DE) . |
| 197 55 549 | 10/1998 | (DE) . |
| 000 287 | 1/1979 | (EP) . |

* cited by examiner

Primary Examiner—Christopher P. Schwartz
(74) Attorney, Agent, or Firm—Cohen, Pontani, Lieberman & Pavane (57) ABSTRACT

A pneumatic spring having a vibration damper and a rolling bellows which defines a spring chamber. The rolling bellows is actively connected at one end to the vibration damper which has a container pipe which possesses a connecting bearing to a motor vehicle chassis. The connecting bearing is arranged in the region of the outer surface of the container pipe. The connecting bearing is of circular design and possesses a sealing ring which seals the spring chamber. Furthermore, the connecting bearing can be designed as a pivot bearing, having at least one universal ball joint in conjunction with a ball socket. Optionally, an air direction device may be assigned to the pneumatic spring, producing a targeted air flow onto the container pipe.

16 Claims, 7 Drawing Sheets

PNEUMATIC SPRING WITH A VIBRATION DAMPER

BACKGROUND OF THE INVENTION

1. Field of the Invention

The invention relates to a pneumatic spring with a vibration damper.

2. Discussion of the Prior Art

German reference DE 197 55 549 A1 describes a pneumatic spring having a vibration damper. Frequently, a pneumatic spring and a vibration damper are installed separately in a vehicle as individual subassemblies. There is an important reason for this method of construction. The structural space within the chassis is so confined that a pneumatic spring of sufficiently large dimensions cannot always be installed concentrically with the vibration damper.

In order to eliminate axial structural space problems in the case of vibration dampers, some solutions are known in which the connecting members of the vibration damper have been specially designed. For example, German reference DE 196 25 106 A1 describes a vibration damper in which at least two laterally mounted bearings have been produced. The gain in axial structural space corresponds to the structural height of a bearing.

A further problem resides in the fact that, during operation of vibration dampers, waste heat is produced due to the operating principle, caused by the throttling of a damping medium within the vibration damper. This waste heat is adequately removed by the slipstream. The container pipe of the vibration damper represents a heat exchanger with the ambient air. In the event of deficient heat removal, the sealing of the vibration damper may be damaged, which would result in a functional failure of the whole vibration damper.

SUMMARY OF THE INVENTION

Accordingly, it is an object of the present invention to find a solution for the confined structural space of a pneumatic spring with a vibration damper. A further object lies in ensuring heat removal for the vibration damper. In addition, adequate angular mobility of the vibration damper within the chassis is to be guaranteed.

The object regarding the structural space is achieved, according to the invention, in that the connecting bearing is arranged in the region of the outer surface of the container pipe, the connecting bearing being of circular design and possessing a sealing ring which seals the spring chamber.

First, advantageously, a substantial saving of axial structural space is achieved. A further essential advantage resides in the fact that a conventional elastic bearing element, in addition to its anti-vibration insulation function, also performs a sealing function for the spring chamber. The bearing element is of such large dimensions that a correspondingly large sealing surface and sealing gap lengths are present, which ensure reliable sealing of the spring chamber of the pneumatic spring.

In a further embodiment, the connecting bearing possesses a radial prestress sleeve whose prestress force is active toward the container pipe. The effect of this is that the connecting bearing or the sealing ring of the connecting bearing is not dependent on its own prestress to perform its function.

To absorb the tensile forces acting on the vibration damper, the prestress sleeve possesses a base which represents an axial prestress surface for the connecting bearing. Furthermore, the connecting bearing possesses a fixing disk which prestresses the sealing ring axially to the base of the prestress sleeve. As a result, the sealing ring is guided on all sides within the prestress sleeve between the base and the fixing disk. Said components form an independent structural unit.

To transmit forces from the container pipe to the connecting bearing, the sealing ring possesses a support ring actively connected to the container pipe. In this arrangement, the support ring is at least axially enclosed by the sealing ring.

In an embodiment of the invention, that the connecting bearing possesses a sealing ring for sealing the spring chamber and a bearing ring for absorbing the damping support forces. A bearing ring may also have to meet other specific requirements, which for example demand a different material. The use of two ring elements may therefore be entirely logical.

In order, furthermore, to obtain a compact pneumatic spring/vibration damper structural unit, the sealing ring and the bearing ring are supported on the support ring.

With regard to the partial object of particularly smooth angular movement between the vibration damper and the pneumatic spring, the connecting bearing is designed according to the invention as a pivot bearing, possessing at least one universal ball joint in connection with a ball socket.

In order for the connecting bearing to be simple to install, the ball socket is of divided design in the axial direction of the pneumatic spring.

It has proven highly advantageous here if the sealing ring is inserted within the running surface of the ball socket. In this area, the sealing ring has a constant prestress.

In a further embodiment, the sealing ring is inserted between ball socket shells which form the ball socket. The sealing ring is thus able to undertake a sealing function at its inner and its outer diameters.

In order for the radial structural space requirement to remain low, the ball socket shells are radially held by the prestress sleeve.

The further components of the connecting bearing are likewise used for guidance, the ball socket shells being axially held by the base of the prestress sleeve and/or by the fixing disk.

With appropriate numbers of units, provision may be made for the fixing disk and a ball socket shell to be of integral design. Consequently, the prestress sleeve may also be designed integrally with a ball socket shell.

It is envisaged that at least one of the parts, prestressing the sealing ring, of the connecting bearing is connected to the chassis. The spring force of the pneumatic spring is thus decoupled from the vibration damper. The container pipe may be produced with thin walls. A small structural space can also be provided for the bearing, since only the damping forces now have to be supported.

In yet another embodiment, the prestress sleeve possesses a dimension extending beyond the connecting bearing with a connection to the chassis. The prestress sleeve can easily be produced with fairly thick walls, so that sufficient structural space exists, for example, for a screw connection to the chassis.

In a further embodiment of the pneumatic spring, a stop buffer is arranged in the spring chamber and moves relative to the container pipe of the vibration damper. The pneumatic spring possesses an impact surface which is held by the prestress sleeve in a fixed position relative to the connecting bearing. The compressive forces of the stop buffer which arise are directly supported on the chassis. For this purpose, cylindrical pipe-end caps are generally used which form the impact surface in order to protect the sensitive seal of the piston rod of the vibration damper. This expense is completely eliminated by the present invention.

With a sufficiently large number of units of the pneumatic spring according to the invention, it is possible to arrange for the impact surface to be designed integrally with the prestress sleeve. In order not to waste any structural space, the impact surface of the prestress sleeve is formed by the back of the base.

To achieve the partial object of the invention relating to heat removal, the pneumatic spring is assigned an air direction device which produces a targeted air flow onto the container pipe. A heat build-up critical for the vibration damper is thus prevented.

In this arrangement, the air direction device is formed by a spoiler. The spoiler may be a simple molding of metal or plastic which deflects the air flow at the chassis.

The shaping of the air direction device is selected so that the air direction device is directed toward the connecting bearing. A critical component is thus specially protected.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
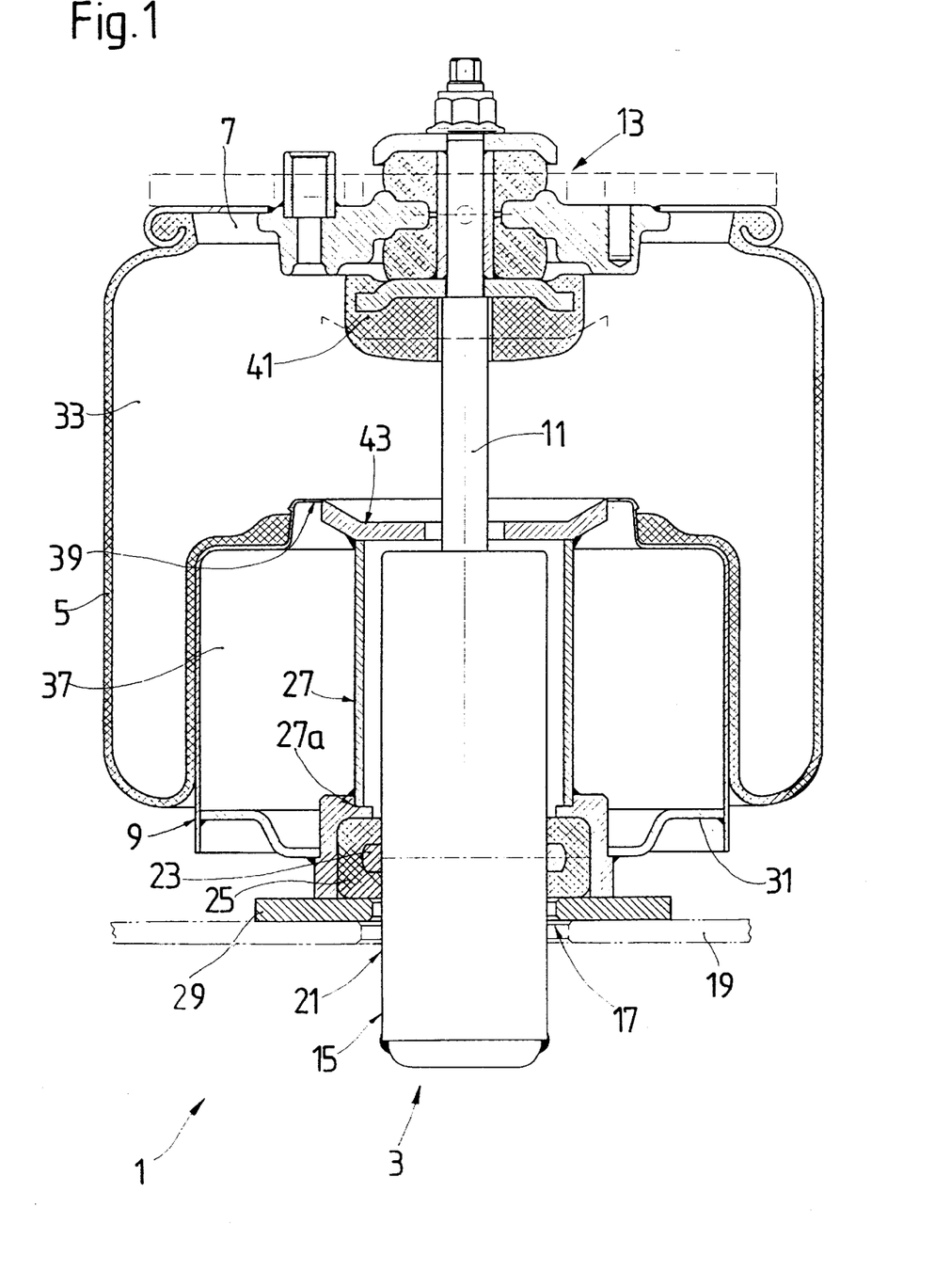
FIG. 1 shows a pneumatic spring having a vibration damper with an angularly rigid connecting bearing.

FIG. 1 shows a pneumatic spring 1 in connection with a vibration damper 3. The pneumatic spring 3 comprises a rolling bellows 5 which is sealingly clamped against a fixing plate 7. The fixing plate 7 serves as an element connecting the pneumatic spring to a vehicle structure. At its other end, the rolling bellows 5 is stressed on a rigid rolling pipe 9 which is arranged in a fixed position relative to the vibration damper 3.

Concentrically with the rolling bellows 5, the vibration damper 3 is connected by its piston rod 11 to the fixing plate 7. The piston rod 11 has a pin-type joint 13 which permits a cardanic movement of the piston rod 11 relative to the fixing plate 7. A container pipe 15 of the vibration damper 3 is also shown as an individual part, which is connected via a connecting bearing 17 to a chassis 19, only shown diagrammatically. The connecting bearing 17 is provided on an outer surface 21 of the container pipe 15. In addition, the connecting member has a support ring 23 which is enclosed on both sides and externally by a sealing ring 25. The sealing ring 25 is of elastic design and permits an angular movement of the container pipe 15.

The sealing ring 25 is radially prestressed by a prestress sleeve 27 toward the container pipe 15. The prestress sleeve has a base 27a, which supports the sealing ring 25 in an upward movement of the container pipe 15. In the opposite direction, a fixing disk 29 serves as a retaining means for the sealing ring 25. The container pipe 15, the prestress sleeve 27 with the sealing ring 25 and the fixing disk 29 form a prefittable structural unit.

Arranged between the prestress sleeve 27 and the rolling pipe 9 is an angled cover plate 31, so that a main spring chamber 33, essentially defined by the fixing plate 7 and the rolling bellows 5, and an additional spring chamber 37 are provided between the rolling pipe 9 and the prestress sleeve 27, closed by the cover plate 31. The rolling pipe 9 has connection apertures 39 between the spring chambers. The intention of the additional spring chamber 37 is to provide the largest-volume spring chamber possible, which allows a lower spring rate.

In the illustrated embodiment, the connecting bearing 17 is arranged directly on the chassis 19. As a result, an angularly rigid arrangement of the vibration damper 3 is achieved. The fixing disk 29, as part of the connecting bearing, is directly connected to the chassis 19, for example by screwing. As a result, all spring forces are directly supported by the chassis 19. The vibration damper 3 is in practice parallel-connected and only has to absorb the damping forces, so that the vibration damper 3 can be designed for lower loads because the load is reduced by comparison with the state of the art.

Within the main spring chamber 33, a stop buffer 41 is fixed to the piston rod 11 and, above a particular state of spring deflection, comes into contact with an impact surface 43. The impact surface 43 is likewise supported by the prestress sleeve 27, so that this load is also supported on the chassis 19, circumventing the vibration damper 3.

Figure 2:
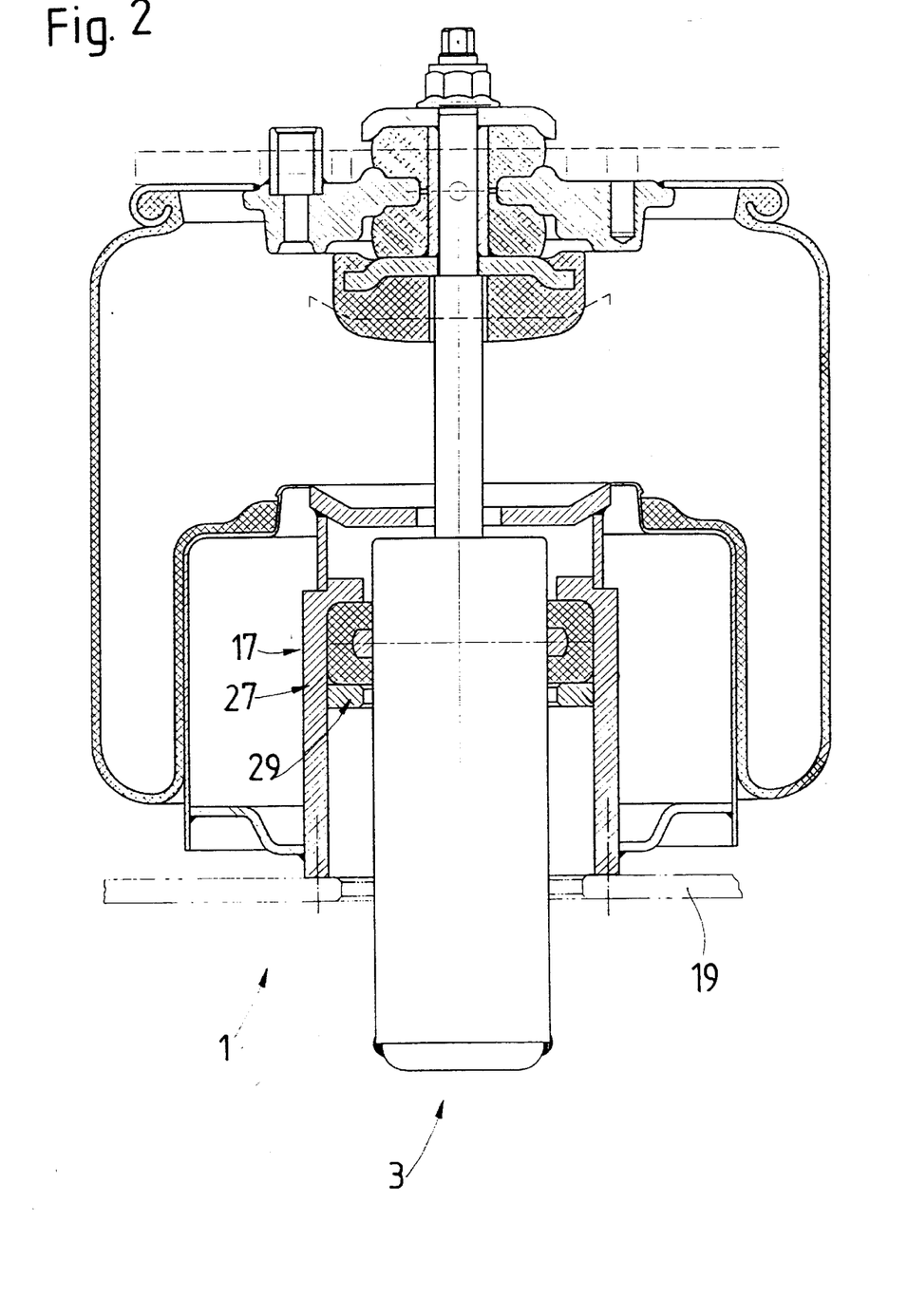
FIG. 2 shows a pneumatic spring having an angularly elastic connecting bearing.

The embodiment according to FIG. 2 differs from that of FIG. 1 in that the connecting bearing 17 is at a significant axial distance from the chassis 19. In this arrangement, the prestress sleeve 27 is connected to the chassis 19, for example screwed to the end face. The fixing disk 29 can be welded, pressed or screwed into the prestress sleeve 27. As a result of the raised position of the connecting bearing 17, the vibration damper 3 can more easily move cardanically relative to the prestress sleeve 27 and hence to the chassis 19.

Figure 3:
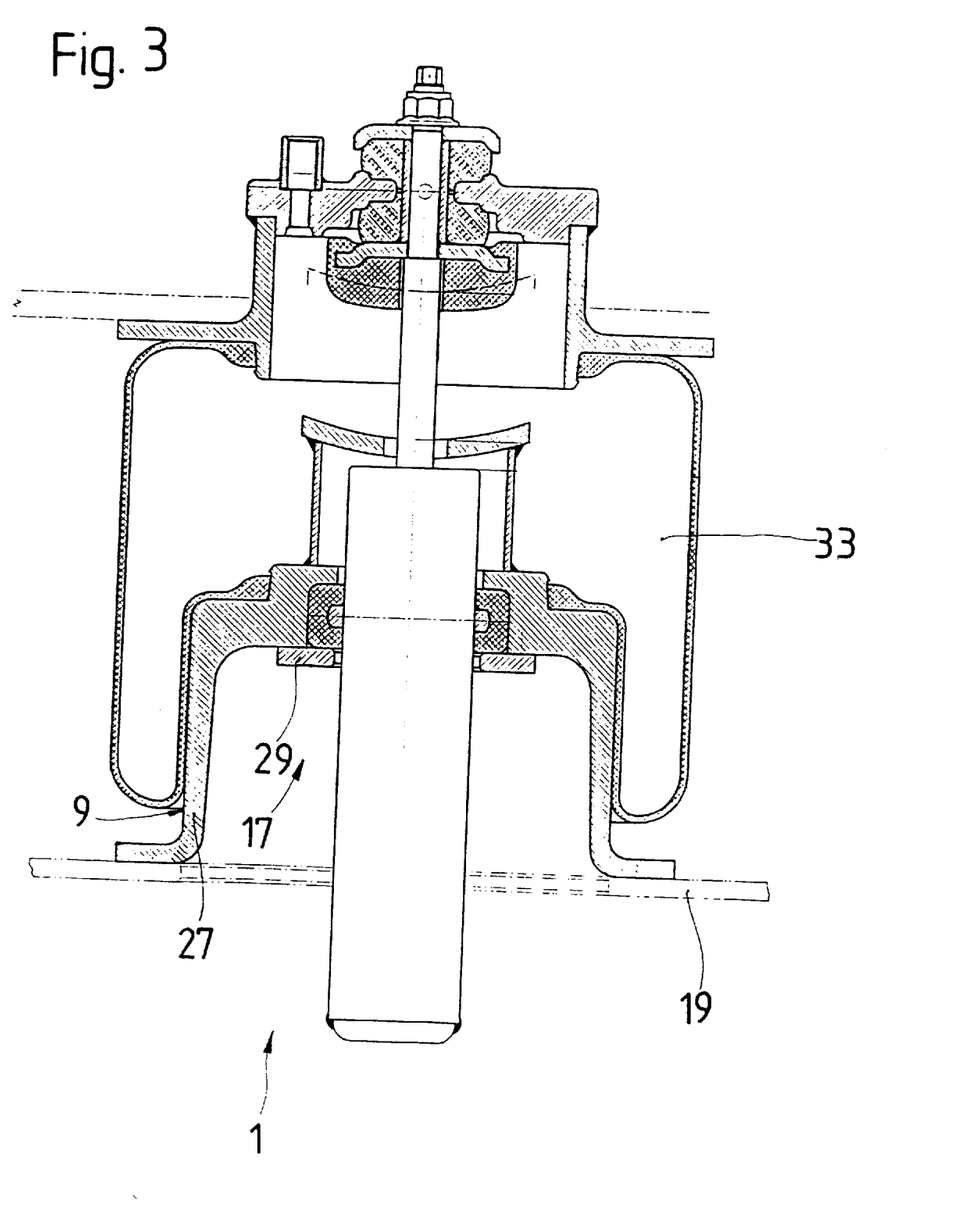
FIG. 3 shows a pneumatic spring having a prestress sleeve, which possesses a rolling contour for the rolling bellows.
Figure 4:
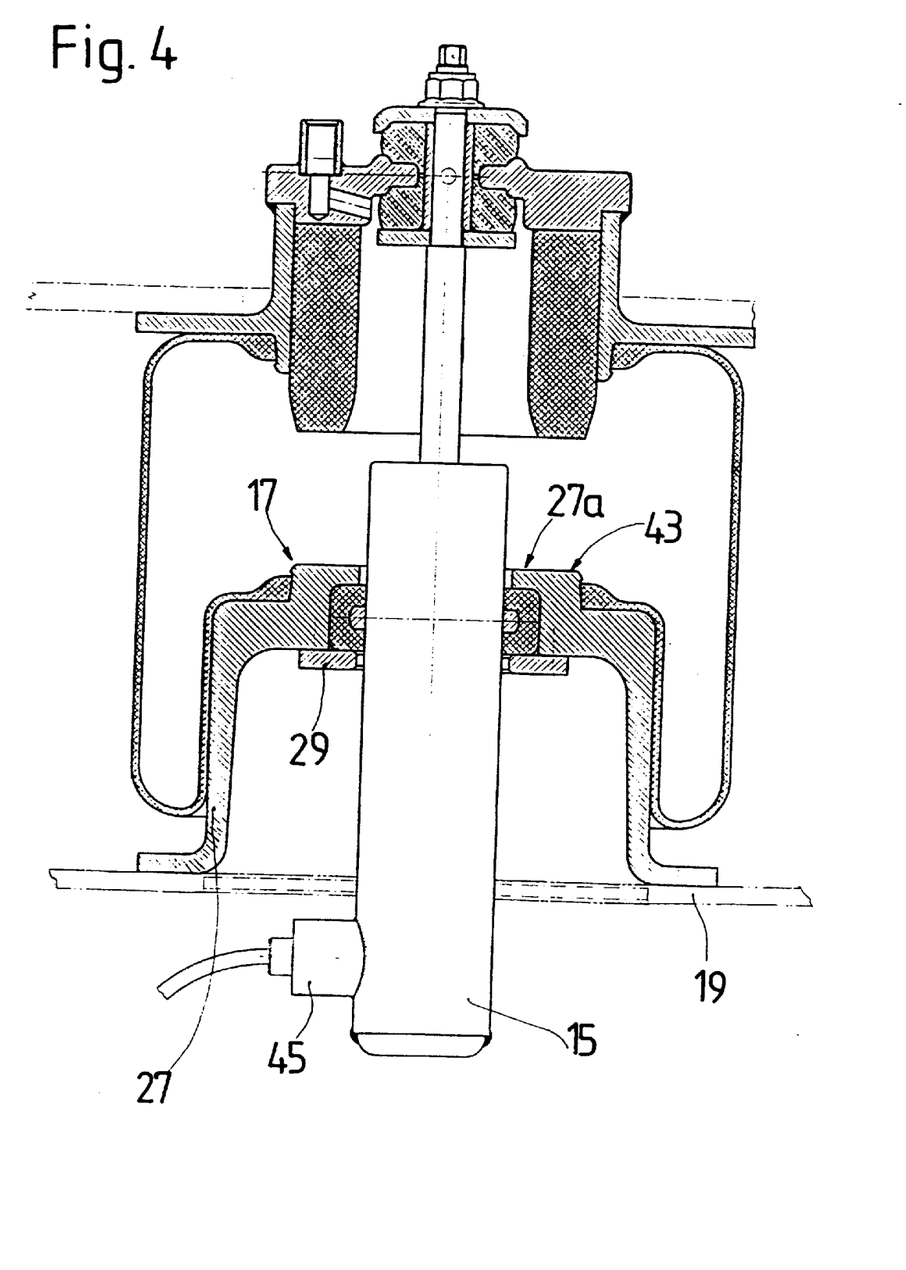
FIG. 4 shows a pneumatic spring having an impact surface for a stop buffer.

The intention of FIGS. 3 and 4 is to illustrate that the prestress sleeve 27 may also have a contour such as a rolling pipe. In these pneumatic springs 1, the use of an additional spring chamber has been dispensed with. Moreover, in both embodiments, the connecting bearing 17 has been raised and the connection to the chassis 19 taken over by the prestress sleeve 27. A prestress sleeve 27 corresponding to FIGS. 3 and 4 may be produced as a casting or forging. The fixing disk 29 is simply screwed to the underside of the prestress sleeve 27.

The intention of FIG. 4 is to illustrate that the additional structural space below the connecting bearing 17 can be used, for example, for an external adjustment valve 45 of the vibration damper 3 which, depending on the method of construction, may also be controlled by the pneumatic spring. Moreover, the circular stop buffer 41 is used, whose inner diameter is greater than the outer diameter of the container pipe 15. The impact surface 43 for the stop buffer is formed by the base 27*a* of the prestress sleeve.

Figure 5:
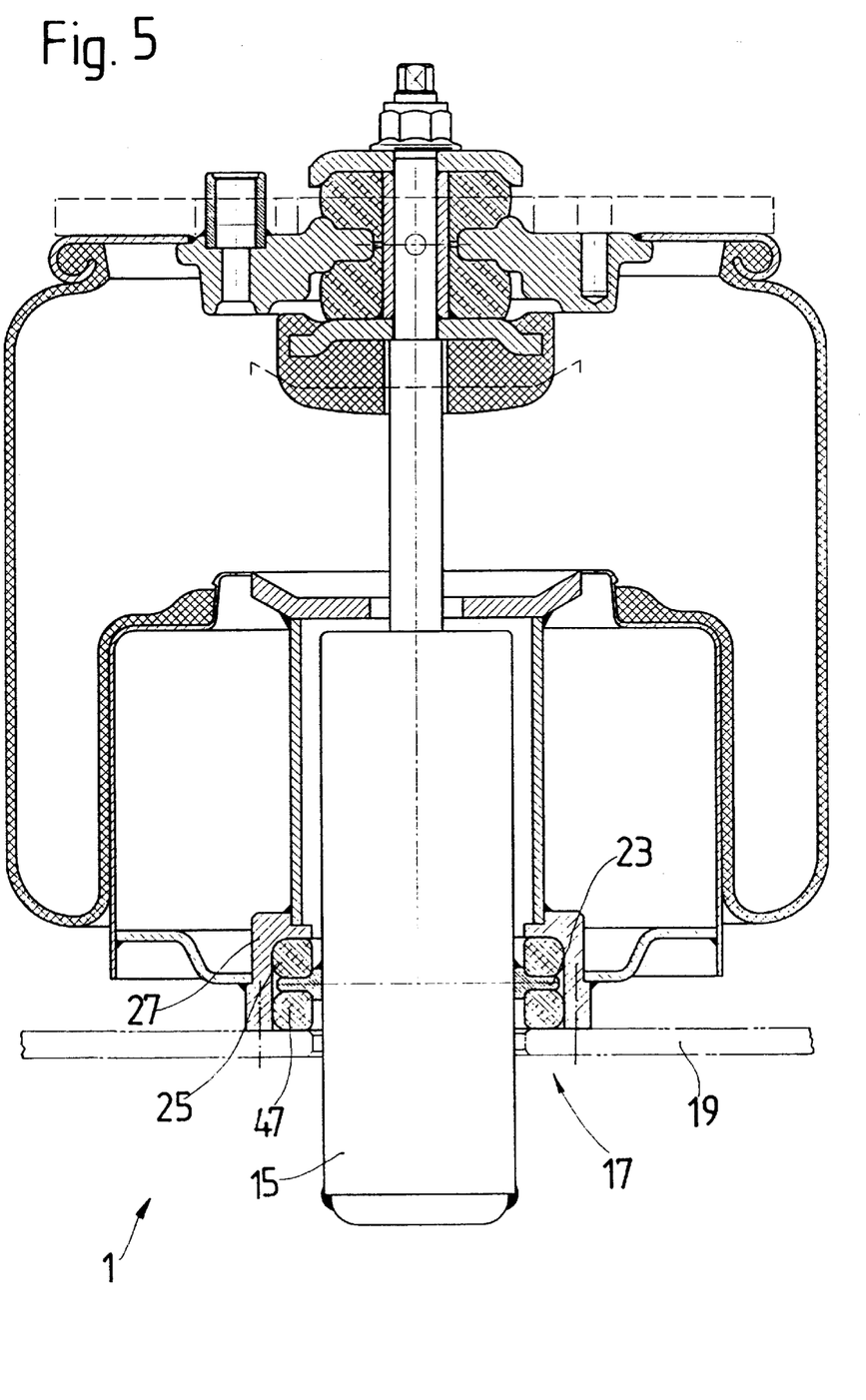
FIG. 5 shows a pneumatic spring having a bearing ring and a sealing ring in the connecting bearing.

FIG. 5 shows a modification of FIG. 1 in the region of the connecting bearing 17, in which, as a variation, the sealing ring 25 and, in addition, a bearing ring 47 are used. The sealing ring 25 can of course also take on bearing forces and the bearing ring 47 can also take on the sealing function, but a more specific selection and dimensioning of the individual rings may be undertaken.

A further difference from FIG. 1 resides in the fact that the bearing ring 47 rests directly on the chassis 19. It is useful for the installation procedure if the bearing ring 47 possesses a slight prestress relative to the support ring 23 or to the prestress sleeve 27, so that the bearing ring 47 does not unintentionally fall out from the connecting bearing 17.

Figure 6:
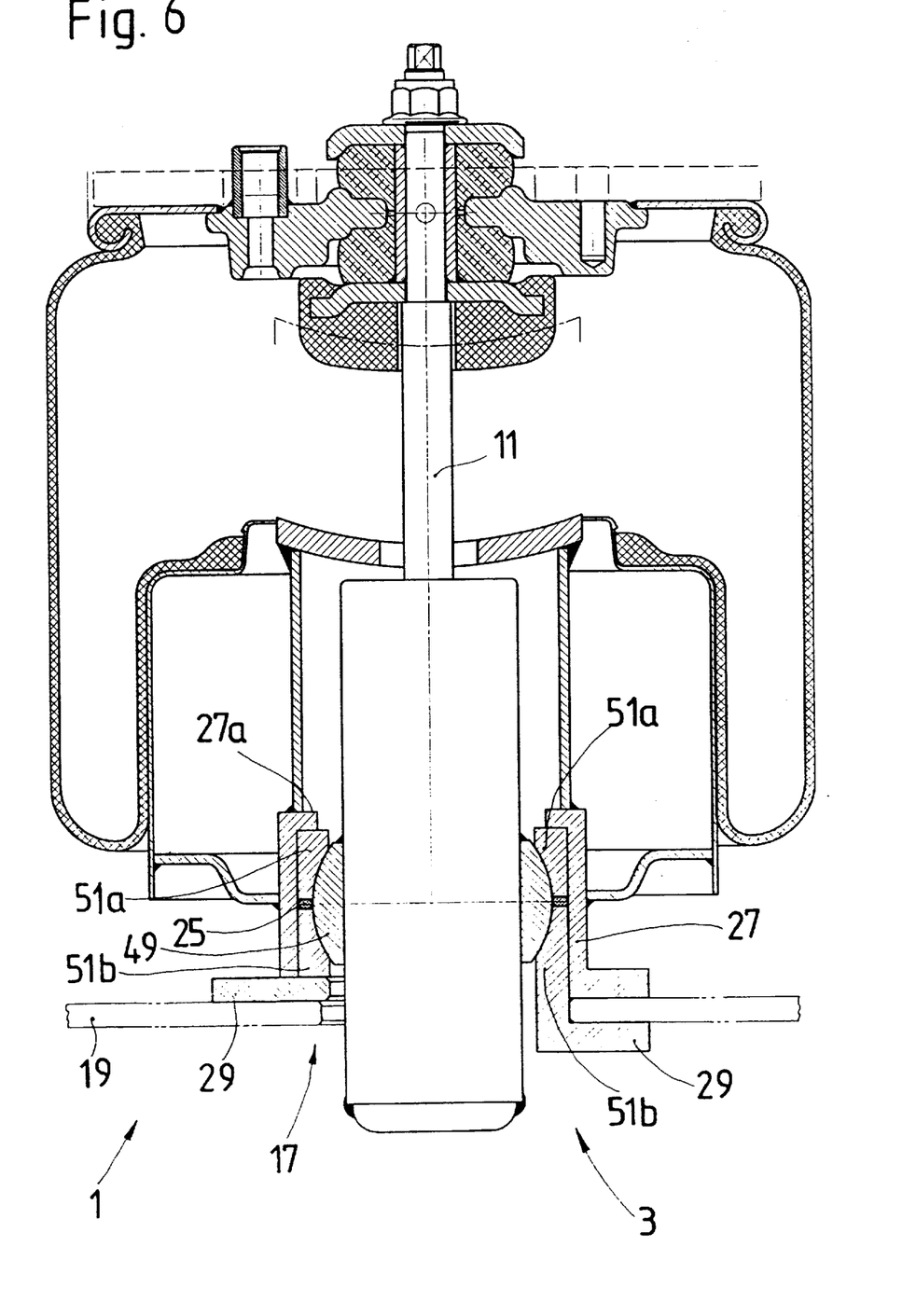
FIG. 6 shows a pneumatic spring with an angularly movable pivot bearing.

FIG. 6 shows a further modification of the connecting bearing 17 in a pneumatic spring 1 in connection with a vibration damper 3. The connecting bearing 17 has an annular ball socket 49 on which two ball socket shells 51*a*, 51*b* engage, thus forming a running surface for the universal ball joint. Arranged between the ball socket shells 51*a*, 51*b* is the sealing ring 23, which can perform a sealing function with its inner and outer diameters. Radially, the ball socket shells 51*a*, 51*b* are held by the prestress sleeve 27. Axially, the base 27*a* and the fixing disk 29 serve as fixing means. It is entirely conceivable for the ball socket shell 51*a* to be designed integrally with the prestress sleeve 27. In the left-hand half-section, the fixing disk 29 is screwed to the prestress sleeve. Another screw fastening exists between the fixing disk and the chassis 19.

In the right-hand sectional half of FIG. 6, it is shown that not only can the upper ball socket shell 51*a* be designed integrally with the prestress sleeve 27 but the fixing disk 29 can be designed integrally with the lower ball socket shell 51*b*. As is apparent, the connection of the connecting bearing 15 to the chassis 19 is simplified in that simple through screws can be used between the prestress sleeve 27 and the fixing disk 29. In the embodiment according to FIG. 6, an obliquely positioned vibration damper can be produced very simply, so that transverse force compensation relative to the piston rod 11 is possible.

Figure 7:
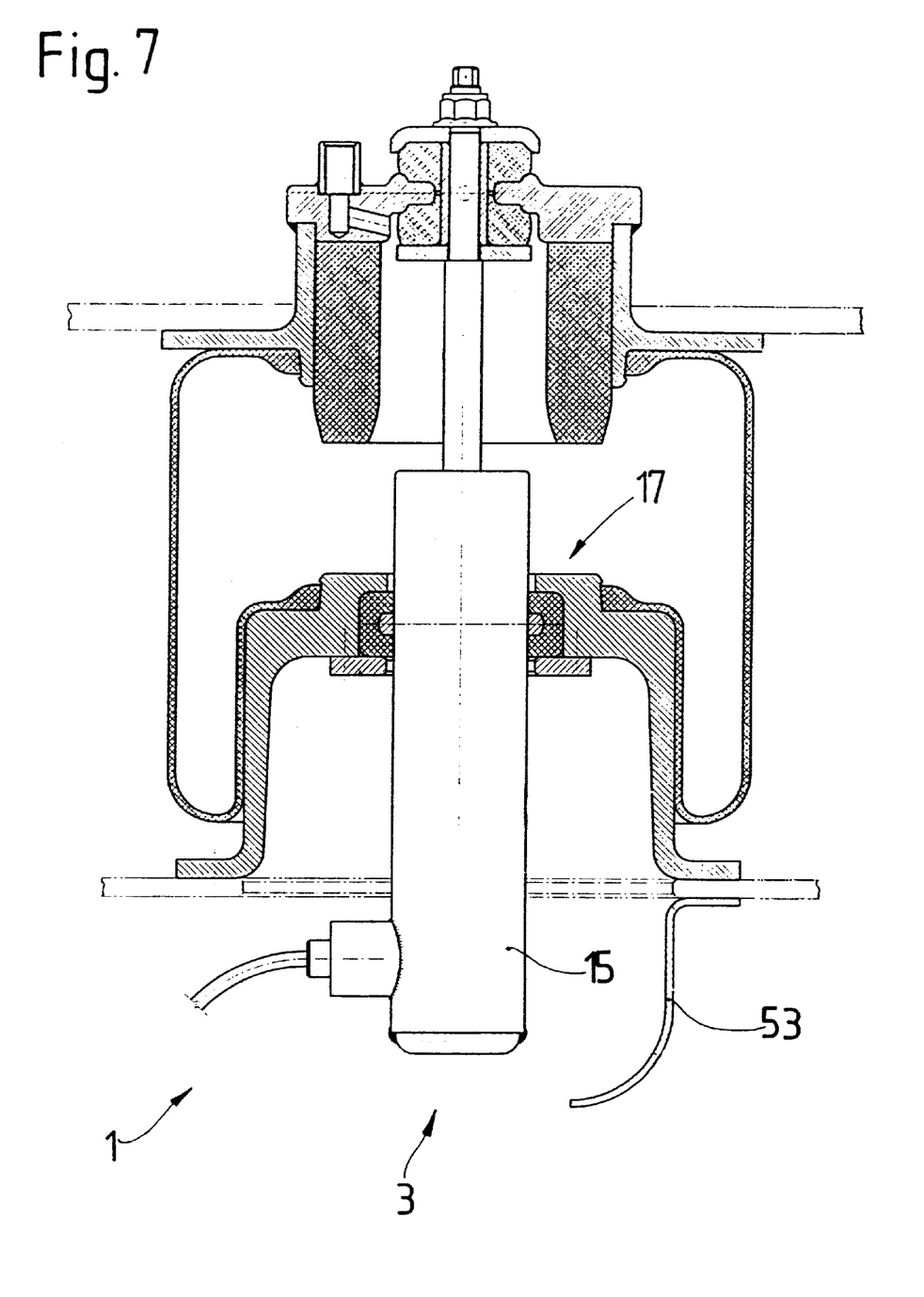
FIG. 7 shows a pneumatic spring having an air direction device.

FIG. 7 shows a further development of FIG. 4, the use of an air direction device 53 not necessarily having to be combined with an embodiment of a pneumatic spring/vibration damper structural unit according to FIGS. 1 to 6. The air direction device 53 can also be used in a conventional pneumatic spring, as referred to in the prior art. The air direction device is a spoiler whose shape is designed so that the slipstream within the chassis is directed toward the vibration damper 3. In particular, the connecting bearing 17 and the piston rod seal (not shown) of the vibration damper are to be cooled by the circulating air.

The invention is not limited by the embodiments described above which are presented as examples only but can be modified in various ways within the scope of protection defined by the appended patent claims.

We claim:

1. A pneumatic spring, comprising:

a vibration damper having a container pipe;

a rolling bellows which defines a spring chamber, the rolling bellows being actively connected at one end to the vibration damper; and a connecting bearing for connecting the container pipe to a motor vehicle chassis, the connecting bearing being arranged in a region of an outer surface of the container pipe, the connecting bearing being of circular design and having a sealing ring arranged to seal the spring chamber, the connecting bearing including a radial prestress sleeve having a prestress force active toward the container pipe.

2. A pneumatic spring as defined in claim 1, and further comprising a stop buffer arranged in the spring chamber so as to move relative to the container pipe of the vibration damper, and an impact surface held by the prestress sleeve in a fixed position relative to the connecting bearing.

3. A pneumatic spring as defined in claim 2, wherein the impact surface is integral with the prestress sleeve.

4. A pneumatic spring as defined in claim 3, wherein the prestress sleeve has a base, the impact surface of the prestress sleeve being formed by a back of the base.

5. A pneumatic spring as defined in claim 1, wherein the prestress sleeve has a base which forms an axial prestress surface for the connecting bearing.

6. The pneumatic spring as defined in claim 5, wherein the connecting bearing includes a fixing disk arranged to prestress the sealing ring axially to the base of the prestress sleeve.

7. A pneumatic spring as defined in claim 1, wherein the connecting bearing further includes a bearing ring arranged to absorb damping support forces.

8. A pneumatic spring as defined in claim 7, and further comprising a support ring connected to the container pipe, the sealing ring and the bearing ring being supported on the support ring.

9. A pneumatic spring, comprising:

a vibration damper having a container pipe;

a rolling bellows which defines a spring chamber, the rolling bellows being actively connected at one end to the vibration damper;

a connecting bearing for connecting the container pipe to a motor vehicle chassis, the connecting bearing being a pivot bearing having at least one universal ball joint in connection with a ball socket, the connecting bearing having a sealing ring arranged to seal the spring chamber, the ball socket being divided in an axial direction of the pneumatic spring to form ball socket shells; and a prestress sleeve having a prestress active toward the container pipe, the ball socket shells being radially held by the prestress sleeve.

10. A pneumatic spring as defined in claim 9, and further comprising a fixing disk arranged to prestress the sealing ring axial to a base of the prestress sleeve, the ball socket shells being axially held by at least one of the base of the prestress sleeve and the fixing disk.

11. A pneumatic spring as defined in claim 10, wherein the fixing disk and one of the ball socket shells are integral.

12. A pneumatic spring as defined in claim 10, wherein the prestress sleeve is integral with one of the ball socket shells.

13. A pneumatic spring as defined in claim 10, wherein at least one of the prestress sleeve and the fixing disk is connectable to the chassis.

14. A pneumatic spring as defined in claim 9, wherein the sealing ring is inserted within a running surface of the ball socket.

15. A pneumatic spring as defined in claim 9, wherein the sealing ring is inserted between the ball socket shells.

16. A pneumatic spring, comprising:
a vibration damper having a container pipe;
a rolling bellows which defines a spring chamber, the rolling bellows being actively connected at one end to the vibration damper; and
a connecting bearing for connecting the container pipe to a motor vehicle chassis, the connecting bearing being arranged in a region of an outer surface of the container pipe, the connecting bearing being of circular design and having a sealing ring arranged to seal the spring chamber, the sealing ring including a support ring actively connected to the container pipe and the support ring being axially enclosed by the sealing ring.

* * * * *